United States Patent Office 3,557,024
Patented Jan. 19, 1971

3,557,024
ALUMINA-BONDED CATALYSTS
Dean Arthur Young and Grant A. Mickelson, Yorba Linda, Calif., assignors to Union Oil Company of California, Los Angeles, Calif., a corporation of California
No Drawing. Filed Mar. 18, 1968, Ser. No. 713,993
Int. Cl. B01j 11/40
U.S. Cl. 252—455
16 Claims

ABSTRACT OF THE DISCLOSURE

The invention relates to siliceous materials, particularly zeolite-base catalysts, which employ acid-treated boehmite alumina as a binder. The acid treatment consists of treatment of the boehmite with at least 0.5 equivalent of acid per mole of boehmite. The acid employed in the treatment is a mineral acid having a monovalent anion or a salt thereof, e.g., nitric acid, hydrochloric acid or their salts. The catalysts find utility in processes such as cracking, hydrocracking, hydrotreating, isomerization, etc. The binder composition comprising the acid-treated boehmite may also be used for binding a variety of siliceous compositions such as amorphous combinations of silica and alumina, activated clays, silica gel, etc.

---

Crystalline aluminosilicate zeolites are conventionally used as catalysts or catalysts supports for a variety of catalytic reactions, such as hydrocarbon conversion reactions. These crystal line materials are, however, finely divided when initially prepared and must be formed into agglomerates by processes such as extruding, molding, casting, etc. In addition, a suitable binding agent is usually essential to impart sufficient strength to the resulting aggregates. In general, any catalyst having a crushing strength less than about 7 pounds will have limited usefulness in large scale equipment due to the packing weight in tall columns. The present invention is directed to the preparation and use of an improved binding agent comprising acid-treated boehmite. This binding agent enables preparation of a zeolite composition that is readily amenable to extrusion, pelleting, molding, casting, etc. and results in a product having a greatly improved crushing strength.

In accordance with the invention it has been found that the type of alumina and the amount of acid are critical in obtaining a product of high crushing strength. In addition, it has been found that strong acids, i.e., mineral acids are superior to the weaker acids, such as organic acids.

The use of alumina as a binder for zeolites and other siliceous materials is conventional and is disclosed, e.g., in U.S. Pats. 2,865,867, 3,173,855 and 3,326,818. However, the prior art procedures have generally resulted in products having one or more deficiencies such as low crushing strength, low zeolite content, limitation to certain types of zeolites, etc. It has now been found that the use of the boehmite form of alumina is essential to obtaining products having the desired high crushing strength, high zeolite content and applicability to a wide variety of zeolites and other siliceous materials. The presence of even minor amounts of other forms of alumina, such as bayerite, has an adverse effect on the quality of the product, particularly on its crushing strength.

In addition it has now been found that the use of at least 0.5 equivalent of acid per mole of boehmite is essential in obtaining a product of high crushing strength. Amounts of acid up to about 2 equivalents per mole of boehmite are generally satisfactory; however, a maximum of about 1 equivalent per mole of boehmite is usually preferable. Within these limits the optimum amount of acid may vary considerably, depending on the type of acid and siliceous material, amount of binder and intended use of the aggregate.

Boehmite is, of course, a conventional material and can be prepared by a variety of processes, as exemplified by the following procedures:

(1) Thermally decompose aluminum nitrate or chloride in air at 200 to 600° C. Rehydrating the decomposition product in hot ammonium hydroxide forms a boehmite with excellent bonding properties.

(2) Add alum or an aluminum salt to excess ammonium hydroxide at temperatures above 60° C. The reaction product should be kept hot during washing and drying to avoid the conversion of boehmite to bayerite. The boehmite is stabilized either by drying or the addition of an acidifying agent.

(3) Add alum or an aluminum salt to sodium hydroxide or carbonate at temperatures above 80° C. The resulting boehmite must be dried hot or acidified to avoid recrystallization.

(4) React sodium aluminate with alum or an aluminum salt according the above procedure.

(5) React sodium aluminate with an acid to give about pH 9 above 80° C.; then dry or acidify as described previously.

The boehmite may be either a freshly prepared filter cake or a dried powder, provided the drying temperature does not exceed 250° C. These materials characteristically have particle sizes of about 0.2 to 10 microns, surface areas of about 50 to 300 square meters per gram and water contents of about 15 to 80 wt. percent. They are also characterized by positively charged surfaces. Accordingly, they may also contain other materials having surface charge characteristics that are compatible with this positive character of the surfaces. Examples of such materials are nickel or cobalt nitrate or oxide, chromic chloride, etc.

The acidifying agent employed in treating the boehmite are mineral acids containing monovalent anions or acidic salts of such acids. Examples are nitric acid, hydrochloric acid, perchloric acid, aluminum nitrate, aluminum chloride, zirconyl chloride, chromic chloride, ferric chloride, etc. Preferred acidifying agents are nitric and hydrochloric acids and their aluminum salts.

The acidified boehmite should contain from about 40 to 85 percent by weight of water before mixing with the material to be bonded. Thus, if the combined total of water contents of the boehmite and the acidifying agent does not fall within this range, sufficient water should be added to provide the required amount of total water.

The acidifying agent and water should be sufficiently thoroughly dispersed in the boehmite to obtain an even consistency. Mullers, kneaders or blenders may be used to combine the boehmite with the acidifying agent and water to obtain such a dispersion. Heating or injection of steam also aids in producing a suitable combination. The pH of the resulting mixture should be between about 2.0 and 5.0. The preferred pH range is 2.5 to 3.0 with a water content of 60 to 75 percent.

Crystalline aluminosilicate zeolites are conventional and include the natural zeolites faujasite, mordenite, erionite and chabazite and synthetic zeolites A, L, S, T, X and Y. Zeolites X, Y and L are described in U.S. Pats. 2,882,244, 3,130,007 and 3,216,789. These crystalline zeolites are metal aluminosilicates having a crystalline structure such that a relatively large adsorption area is present inside each crystal. They consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion in the crystal of cations, for example, metal ions, ammonium ions, amine complexes, or hydrogen ions. The spaces in the pores may be occupied by water or other adsorbate molecules.

Normally, the crystalline zeolites occur, or are prepared in the sodium or potassium form. The ammonium form of the zeolite is prepared by ion exchange of the sodium or potassium form with an ammonium salt to replace most or all of the sodium or potassium. This procedure for preparation of the ammonium form of zeolites is also conventional and is described in U.S. Pat. No. 3,130,006.

The zeolite catalysts also conventionally contain a wide variety of catalytically active metals or compounds thereof, depending on the process in which the catalyst is to be used. Examples are the metals of Groups II, IV to VI and VIII of the periodic table, or compounds thereof. These metals are incorporated into the zeolite by conventional means such as adsorption or ion-exchange from aqueous solution, mulling or grinding, vapor deposition, etc.

Although the binder composition of the present invention has been found particularly effective in preparation of zeolite-base catalysts, it is also effective in binding of other siliceous materials that may have uses other than as catalysts, e.g., adsorbents, filters, ceramics, etc. Examples of such siliceous materials are amorphous combinations of silica and alumina, activated clays, silica gel, silica-zirconia, silica-magnesia, etc. These materials may also be in an essentially pure state or combined with the metals of Groups IV to VIII.

The following examples will serve to more particularly illustrate the invention and its advantages.

EXAMPLE 1

This example illustrates the adverse effect of the presence of an alumina other than boehmite, i.e., bayerite, and the use of insufficient acid. A catalyst was prepared according to the following procedure:

A 260 g. portion of Harshaw AL–1402P alumina, a spray dried alumina powder containing 23.1% water and composed of 94% boehmite and 5% bayerite, was mulled with 57 ml. water and 38 ml. concentrated nitric acid until the mixture had an even consistency. Calcining a sample at 650° C. showed 46.5% volatile matter. A sample was dispersed in water to determine the acidity. The pH was 3.2 and titration to a phenophthalein end point indicated 0.29 equivalent of acid per mole of anhydrous alumina.

A 125 g. portion of the acidified paste was used to add 20% $Al_2O_3$ to the following mulled mixture: A 200 g. portion of 700° C. precalcined cobalt zeolite Y was mulled for 10 minutes with 65 g. $Ni(NO_3)_2 \cdot 6H_2O$ crystals. Then 61 g. of solid $(NH_4)_6Mo_7O_{24} \cdot 4H_2O$ was added and the mulling continued until the powder was uniform. Finally the 125 g. portion of binder was mulled in and sufficient water added to form an extrudable paste. The final mixture contained 47.2% volatiles at 650° C. Dispersing a portion in distilled water gave 4.9 pH.

The mulled paste was transferred to a cylinder equipped with a hydraulic piston and die for making 1/16-inch extrudate. During the extrusion the hydraulic pressure gradually increased from 300 to about 1000 p.s.i., and the extrudate became watery and finally stopped. Additional pressure only caused water to separate from a rock-like mass which formed in the cylinder. The small quantity of extrudate was aged in a water-saturated atmosphere 2 hours at 140° F. and 2 hours at 200° C., and then dried in steam 2 hours at 240° F. and 2 hours at 280° F. Then the pellets were heated from 400 to 850° F. in circulating air in a rotary calciner. Crushing strength was determined by measuring the force required to break the pellets when they were pressed against a 0.10-inch diameter rod. The average for 20 pellets was 2.4 pounds.

EXAMPLE 2

This example shows that an increase in the amount of acid results in an appreciable improvement in ease of preparation and crushing strength of the catalyst.

A 260 g. portion of Harshaw AL–1402P alumina was mulled with 377 ml. water and 76 ml. concentrated nitric acid. Calcination showed 73.3% volatile matter. The acidity was 0.60 equivalent of acid per mole of alumina with pH 3.2. The binder paste was used to add 20% $Al_2O_3$ to a zeolite Y catalyst according to the procedure of Example 1. A 200 g. portion of precalcined cobalt zeolite Y was mulled with 65 g. $Ni(NO_3)_2 \cdot 6H_2O$ and 61 g. $(NH_4)_6Mo_7O_{24} \cdot 4H_2O$ as previously. Then a 250 g. portion of the acidified alumina binder was added. Lastly, sufficient water was mulled in to form an extrudable paste. The final mixture contained 48.3% volatile matter and had pH 3.6. The paste was charged to the previously described extruder and readily formed 1/16-inch extrudate. The resulting pellets were dried and calcined as previously. The average crushing strength of 20 pellets was 6.2 pounds.

EXAMPLE 3

This example shows the adverse effect of insufficient acid on crushing strength, even when pure boehmite is used.

Boehmite alumina was prepared as follows: A solution of ammonium hydroxide was prepared by mixing 6.5 liters of 28% aqueous ammonia with 6.5 liters water. The solution was heated to 65° C. prior to adding 6.9 kg. of alum crystals. The resulting slurry was kept at 60–65° C. during filtration and washing to remove the sulfate salt. The hot filter cake was immediately transferred to an oven, dried and then ground to powder. Differential thermal analysis indicated that the alumina product was pure boehmite. A 258 g. portion of the dried boehmite was mulled with 38 ml. concentrated nitric acid and 59 ml. water. This binder mixture contained 44.1% volatiles and 0.27 equivalent of acid per mole of alumina, and the pH was 3.4.

Precalcined cobalt zeolite Y, nickel nitrate and ammonium heptamolybdate were combined according to the procedure and quantities used in Example 2.

Then a 119 g. portion of the binder was added to the muller to provide 20% $Al_2O_3$ in the final mixture. Sufficient water was added to form an extrudable paste. The final mixture contained 45.0% volatiles and the pH was 5.1. This combination readily extruded, in contrast to that of Example 1, and the crushing strength of the dried calcined pellets was 3.5 pounds.

EXAMPLE 4

This example shows that crushing strength is further improved when pure boehmite and sufficient acid are used.

A sample of pure boehmite alumina powder, Harshaw AL–XL 3263–4–2P, was mulled with water and concentrated nitric acid to form a paste which contained 68.7% volatiles, contained 0.58 equivalent acid per mole of alumina and had 3.0 pH.

Precalcined cobalt zeolite Y, nickel nitrate and ammonium heptamolybdate were mulled together according to the procedure and quantities used in Example 2.

A 214 g. portion of the boehmite paste was added, followed by sufficient water to form an extrudable mixture. The final volatiles was 44.2% and the pH was 4.0. Pellets were extruded, dried, and calcined as previously. The crushing strength was 7.4 pounds.

EXAMPLE 5

This example shows that a further increase in the amount to acid, to 0.8 equivalent per mole of boehmite, results in further substantial improvement in crushing strength.

A sample of boehmite, prepared by thermally decomposing aluminum chloride in air, was mixed with water and concentrated nitric acid to form a paste which contained 80.8% volatiles and 0.80 equivalent of acid per mole of alumina.

Precalcined cobalt zeolite Y, nickel nitrate, and ammonium heptamolybdate were combined according to the procedure of Example 2.

Then a 334 g. portion of the binder paste was added to provide 20% $Al_2O_3$. No additional water was required to form an extrudable paste. The final mixture contained 54.9% volatiles, and the pH was 4.2. Pellets were extruded, dried, and calcined as previously. The crushing strength was 12.5 pounds.

EXAMPLE 6

This example shows that the crushing strength is substantially increased with incerase in the amount of acid, even though a buffer, $NiCO_3$, is incorporated in the zeolite composition.

A portion of the boehmite alumina described in Example 3 was mulled with concentrated nitric acid and water to form a binder paste which contained 71% volatiles and 0.80 equivalent of nitric acid per mole of alumina. The pH was 3.2.

A 400 g. portion of hydrogen zeolite Y, which had been in 15 p.s.i.a. steam at 1200° F. for 24 hours, was mulled for 20 minutes with 21.3 g. $NiCO_3$ and 82 g. $Ni(NO_3)_2 \cdot 6H_2O$. Then 122 g. $(NH_4)_6Mo_7C_{24} \cdot 4H_2O$ and 67 g. flowers of sulfur were added and mulling continued 10 minutes. Then a 459 g. portion of the alumina paste was added to provide 20% $Al_2O_3$ binder. The final mixture contained 58.9% volatiles and the pH was 3.7. The mixture was extruded, dried, and calcined as described previously, except that the calcination was in a carbon dioxide atmosphere. The crushing strength of the calcined pellets was 11.6 pounds.

EXAMPLE 7

This example shows that addition of the buffer, $NiCO_3$, to the boehmite binder weakens the pellets, whereas addition of the buffer to the zeolite, as in Example 6, does not.

A 400 g. portion of cobalt zeolite Y, which had been calcined at 1300° F., was mulled with 82 g.

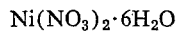

$Ni(NO_3)_2 \cdot 6H_2O$ and 122 g. $(NH_4)_6Mo_7O_{24} \cdot 4H_2O$.

A portion of the boehmite alumina used in Example 5 was mulled with nitric acid and water to form a paste which contained 71.7% volatiles and 0.80 equivalent of acid per mole of alumina. The binder was heated to 90° C. and digested for several hours. Then 21.3 g. nickel carbonate was added to a 444 g. portion.

The nickel-containing binder was then mulled with the catalyst mixture. Sufficient water was added to form an extrudable paste. The final mixture contained 49.4% volatiles, and the pH was 4.1. The paste was extruded, dried and calcined according to the procedure of Example 5. The crushing strength of the calcined pellets was 5.0 pounds.

We claim:

1. The composition which forms on intimately admixing a siliceous base with a binder consisting essentially of hydrous boehmite alumina acidified with at least 0.5 equivalent per mole of said alumina of a strong mineral acid having a monovalent anion or an acidic salt thereof and drying the resultant combination.

2. The composition of claim 1 wherein said siliceous base is selected from crystaline and amorphous silicas, silica-alumina combinations and aluminosilicates and said boehmite alumina consists of less than about 5 wt. percent bayerite on a dry weight basis and is prepared by acidifying hydrous boehmite alumina with 0.5 to about 2 equivalents per mole of said alumina of at least one of nitric acid, hydrochloric acid, perchloric acid, aluminum nitrate, aluminum chloride, zirconyl chloride, chromic chloride and ferric chloride.

3. The composition of claim 1 wherein said binder consists essentially of boehmite alumina containing less than about 5 wt. percent bayerite on a dry weight basis, acidified with about 0.5 to about 2 equivalents per mole of said alumina of at least one of nitric acid and hydrochloric acid and containing 15 to about 85 wt. percent water.

4. The composition of claim 1 wherein said siliceous base is a crystalline aluminosilicate and said binder consists essentially of hydrous boehmite alumina containing about 40 to about 85 wt. percent water acidified with about 0.5 to about 2 equivalents of at least one of nitric acid and hydrochloric acid.

5. The composition of claim 1 wherein said alumina has a surface area within the range of about 50 to about 300 square meters per gram, an average particle size within the range of about 0.2 to about 10 microns and contains about 40 to about 85 wt. percent water.

6. The thermally activated composition of claim 1 wherein said siliceous base further comprises at least one of the metals and metal compounds of Groups II, IV, VI and VIII of the Periodic Chart.

7. The composition of claim 1 wherein said binder consists essentially of boehmite alumina containing less than 5 wt. percent bayerite acidified with about 0.5 to about 2 equivalents per mole of said alumina of at least one of nitric acid and hydrochloric acid and said siliceous base is a crystaline aluminosilicate containing at least one hydrogenation component selected from the Group VI and VII metals and compounds thereof.

8. The composition of claim 1 wherein the said binder consists essentially of boehmite alumina and less than about 4 wt. percent on a dry weight basis of bayerite acidified with about 0.5 to about 2 equivalents of at least one agent selected from hydrochloric acid, nitric acid, perchloric acid, aluminum chloride and aluminum nitrate and said siliceous base comprises a crystalline aluminosilicate containing a buffering amount of at least one buffering compound.

9. The composition of claim 8 wherein said aluminosilicate further comprises at least one hydrogenation component selected from the Group VI and VIII metals and compounds thereof, said buffering compound is nickel carbonate and said agent is selected from nitric acid and hydrochloric acid.

10. The method of intimately admixing a siliceous base with acidified alumina consisting essentially of boehmite alumina acidified with at least about 0.5 equivalent per mole of said alumina of at least one agent selected from strong mineral acids having monovalent anions and the acidic salts thereof and drying the resultant combination.

11. The method of claim 10 wherein said siliceous base is selected from crystalline and amorphous silicas, silica-alumina combinations and aluminosilicates, said alumina consists essentially of boehmite alumina containing less than about 5 wt. percent bayerite on a dry weight basis acidified prior to said admixture with said siliceous base with about 0.5 to about 2 equivalents per mole of said alumina of at least one of hydrochloric acid and nitric acid.

12. The method of claim 10 wherein said siliceous base is selected from crystalline and amorphous silicas, silica-alumina combinations and aluminosilicates containing at least one hydrogenation component selected from the Group VI and VIII metals and compounds thereof, said acidified alumina consists essentially of boehmite alumina acidified with about 0.5 to about 1 equivalent per mole of said alumina of at least one agent selected from hydrochloric acid, nitric acid, perchloric acid, aluminum nitrate, aluminum chloride, zirconyl chloride, chromic chloride and ferric chloride and containing less than about 5 percent on a dry weight basis of bayerite alumina and about 15 to about 85 wt. percent water, and the resultant combination of said siliceous base and said acidified alumina is thermally activated to produce an active catalyst.

13. The method of producing a catalyst composition of improved crush strength comprising aluminosilicate particles bound together with a binder consisting essentially of boehmite alumina which comprises intimately contacting boehmite alumina containing less than about 5 wt. percent of bayerite alumina on a dry weight basis with at least about 0.5 equivalent per mole of said alumina of at least one acidic agent selected from hydrochloric acid, nitric acid, perchloric acid, aluminum chloride, aluminum nitrate, zirconyl chloride, chromic chloride and ferric chloride and drying and thermally activating the resultant aluminosilicate-binder combination.

14. The method of claim 13 wherein said acidifying agent is selected from hydrochloric acid, nitric acid, aluminum chloride, aluminum nitrate, said acidified boehmite alumina comprises from about 15 to about 85 wt. percent of water on admixture with said aluminosilicate and said aluminosilicate further comprises at least one catalytically active component selected from the Group II, IV, VI and VIII metals and compounds thereof.

15. The method of claim 13 wherein said aluminosilicate further comprises at least one of the catalytically active metals or compounds of cobalt, nickel and molybdenum, said boehmite alumina is acidified with about 0.5 to about 2 equivalents per mole of said alumina of at least one of hydrochloric acid, nitric acid, perchloric acid, aluminum chloride and aluminum nitrate.

16. The method of claim 13 wherein said aluminosilicate further comprises at least one catalytically active metal or metal compound selected from Groups VI and VIII, said alumina has a surface area within the range of about 50 to about 300 square meters per gram, a particle size within the range of about 0.2 to about 10 microns and contains about 15 to about 85 wt. percent water prior to admixture with said aluminosilicate, said aluminosilicate further comprises a buffering amount of at least one buffering compound, and said alumina is acidified with about 0.5 to about 1 equivalent per mole of said alumina of at least one of hydrochloric acid, nitric acid, perchloric acid, aluminum chloride and aluminum nitrate.

References Cited
UNITED STATES PATENTS

| | | | |
|---|---|---|---|
| 3,173,855 | 3/1965 | Miale et al. | 252—455X |
| 3,317,277 | 5/1967 | Cosgrove | 23—143 |
| 3,357,791 | 12/1967 | Napier | 23—143 |

DANIEL E. WYMAN, Primary Examiner

C. F. DEES, Assistant Examiner

U.S. Cl. X.R.

252—454, 457, 458, 459